(12) United States Patent
Leslie

(10) Patent No.: US 10,570,948 B1
(45) Date of Patent: Feb. 25, 2020

(54) UNIVERSAL SUPPORT HOOK

(71) Applicant: Yvette B Leslie, Frisco, TX (US)

(72) Inventor: Yvette B Leslie, Frisco, TX (US)

(*) Notice: Subject to any disclaimer, the term of this patent is extended or adjusted under 35 U.S.C. 154(b) by 0 days.

(21) Appl. No.: 15/491,403

(22) Filed: Apr. 19, 2017

Related U.S. Application Data

(60) Provisional application No. 62/324,755, filed on Apr. 19, 2016.

(51) Int. Cl.
*F16B 45/00* (2006.01)
*A47G 25/06* (2006.01)
*F16B 7/04* (2006.01)
*B62B 5/00* (2006.01)
*A47G 29/08* (2006.01)
*A47G 25/40* (2006.01)
*A47G 25/08* (2006.01)

(52) U.S. Cl.
CPC .............. *F16B 45/00* (2013.01); *A47G 25/06* (2013.01); *A47G 25/0678* (2013.01); *A47G 25/08* (2013.01); *A47G 25/4046* (2013.01); *A47G 25/4061* (2013.01); *A47G 29/083* (2013.01); *B62B 5/00* (2013.01); *F16B 7/0493* (2013.01); *Y10S 248/914* (2013.01); *Y10T 24/3444* (2015.01); *Y10T 24/3493* (2015.01); *Y10T 24/45293* (2015.01)

(58) Field of Classification Search
CPC .............. A47G 29/083; A47G 25/0695; A47G 25/0678; A47G 25/08; A47G 25/4046; A47G 25/4061; A47G 25/06; Y10S 248/914; B62B 5/00; F16B 7/0493; F16B 45/00; Y10T 24/3493; Y10T 24/3444; Y10T 24/45293

USPC .... 248/215, 294.1, 307, 304, 308, 305, 306, 248/339, 341, 340, 914
See application file for complete search history.

(56) References Cited

U.S. PATENT DOCUMENTS

| | | | | |
|---|---|---|---|---|
| 253,942 A * | 2/1882 | Onderdonk | ............ | A47G 25/08 211/34 |
| 289,213 A * | 11/1883 | Bracking | ................ | A43D 95/28 24/40 |
| 321,554 A * | 7/1885 | Waterhouse | ............ | F16G 15/02 59/88 |
| 419,141 A * | 1/1890 | Devore | .................. | A47G 25/08 248/308 |
| 550,189 A * | 11/1895 | Melka | ..................... | F16B 45/06 24/598.5 |
| 874,412 A * | 12/1907 | Lewis | .................. | A47G 29/083 211/32 |

(Continued)

*Primary Examiner* — Eret C McNichols
(74) *Attorney, Agent, or Firm* — Kenneth L Tolar

(57) ABSTRACT

A universal support hook includes an elongated pin having a plurality of juxtaposed hangers rotatably mounted thereon. Each hanger includes a C-shaped gripping member with a hinge barrel at an upper end thereof. The hinge barrel includes a central, transverse bore that receives the pin to allow the hanger to freely rotate within a 360-degree range. When any desired number of hangers are raised to a vertical position, their C-shaped gripping members can be secured to a tubular or thin support structure, such as a passenger-seat tray, a closet rod, a chair frame or a shopping-cart handle. The remaining hangers freely hang from the pin to provide a hook for suspending handbags, jewelry items, garments and other similar personal items from the support structure.

6 Claims, 2 Drawing Sheets

(56) References Cited

U.S. PATENT DOCUMENTS

| | | | | |
|---|---|---|---|---|
| 965,151 A * | 7/1910 | Benjamin | A47G 25/08 | 248/308 |
| 1,415,126 A * | 5/1922 | Stahle | A47G 25/08 | 211/32 |
| 1,464,195 A * | 8/1923 | Besaw | B60C 27/08 | 24/577.1 |
| 1,541,314 A * | 6/1925 | Baldwin | B60C 27/08 | 24/577.1 |
| 2,211,273 A * | 8/1940 | Kleckner | F16B 45/06 | 24/598.5 |
| 2,565,719 A | 8/1951 | Church | | |
| 2,874,435 A * | 2/1959 | Nielsen | A44C 5/2033 | 24/598.5 |
| 3,599,298 A * | 8/1971 | Anderson | A44C 5/2033 | 24/598.5 |
| 3,834,598 A * | 9/1974 | Matsumoto | A47G 25/4061 | 211/118 |
| 4,856,744 A * | 8/1989 | Frankel | A47G 23/0225 | 211/113 |
| 4,911,394 A * | 3/1990 | Ericson | B66C 1/34 | 248/301 |
| 5,022,538 A * | 6/1991 | Richmond | A47F 5/0876 | 211/107 |
| 5,181,337 A * | 1/1993 | DuBois | A01K 91/04 | 24/598.5 |
| 5,400,990 A * | 3/1995 | Frankel | A47G 23/0225 | 211/113 |
| 5,884,372 A * | 3/1999 | Anscher | F16L 3/02 | 24/3.12 |
| 6,202,267 B1 * | 3/2001 | Collins | A44C 5/2033 | 24/598.5 |
| 6,390,422 B2 * | 5/2002 | Banko | B62B 9/26 | 211/113 |
| 7,185,864 B2 * | 3/2007 | Adams | A47G 25/0614 | 248/215 |
| 7,841,571 B1 * | 11/2010 | Ghormley | F16L 3/085 | 24/373 |
| D632,952 S * | 2/2011 | Dablemont | D8/367 | |
| 8,083,202 B1 * | 12/2011 | Hutchison | A47G 29/083 | 223/DIG. 4 |
| 8,240,626 B2 * | 8/2012 | Kennedy | B65F 1/1452 | 220/23.4 |
| 9,566,994 B1 * | 2/2017 | Leslie | B62B 5/00 | |
| 9,943,710 B1 * | 4/2018 | Cooper | A63B 29/00 | |
| 2004/0026558 A1 * | 2/2004 | Murphy | B65H 75/00 | 242/404.3 |
| 2004/0206868 A1 * | 10/2004 | Kaufman | B62B 9/26 | 248/214 |
| 2010/0044537 A1 * | 2/2010 | Yen | A47G 29/083 | 248/205.1 |
| 2010/0135712 A1 * | 6/2010 | Igata | B42B 5/08 | 402/36 |
| 2013/0306823 A1 * | 11/2013 | Liu | A47G 29/083 | 248/339 |
| 2014/0042287 A1 * | 2/2014 | Stein | A47G 29/083 | 248/324 |
| 2016/0252130 A1 * | 9/2016 | Fathi | F16B 45/02 | 248/339 |

* cited by examiner

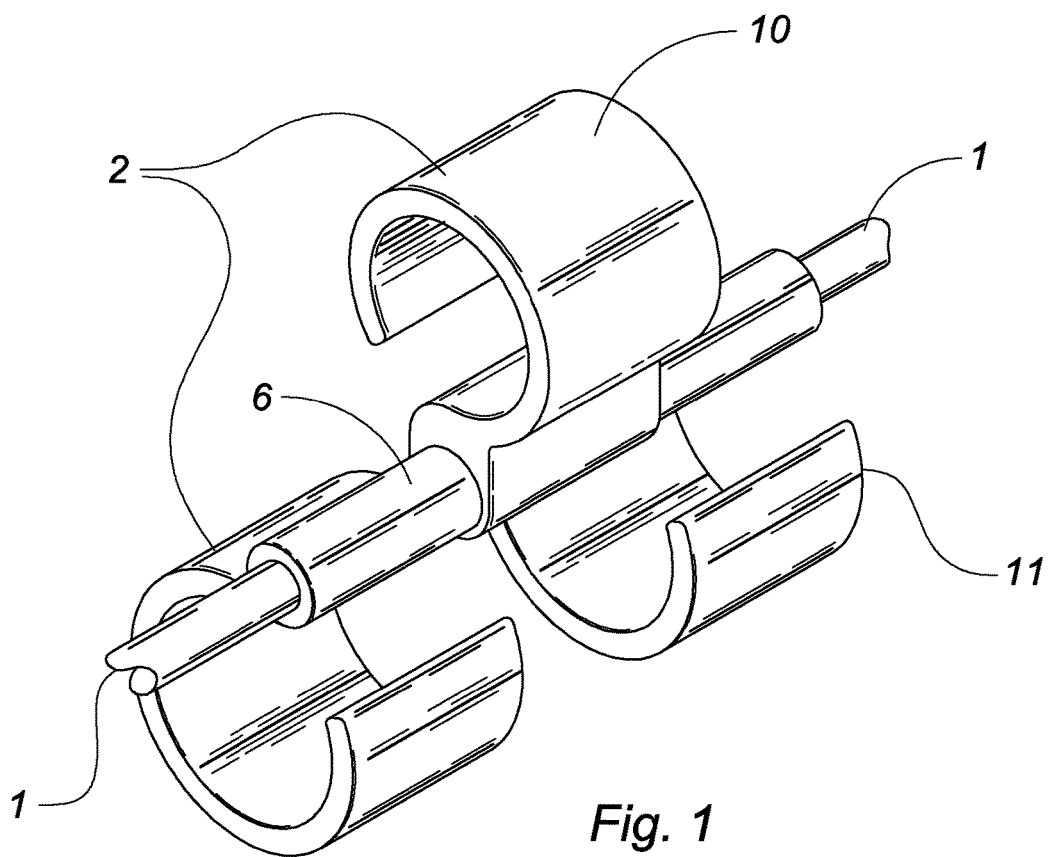
Fig. 1
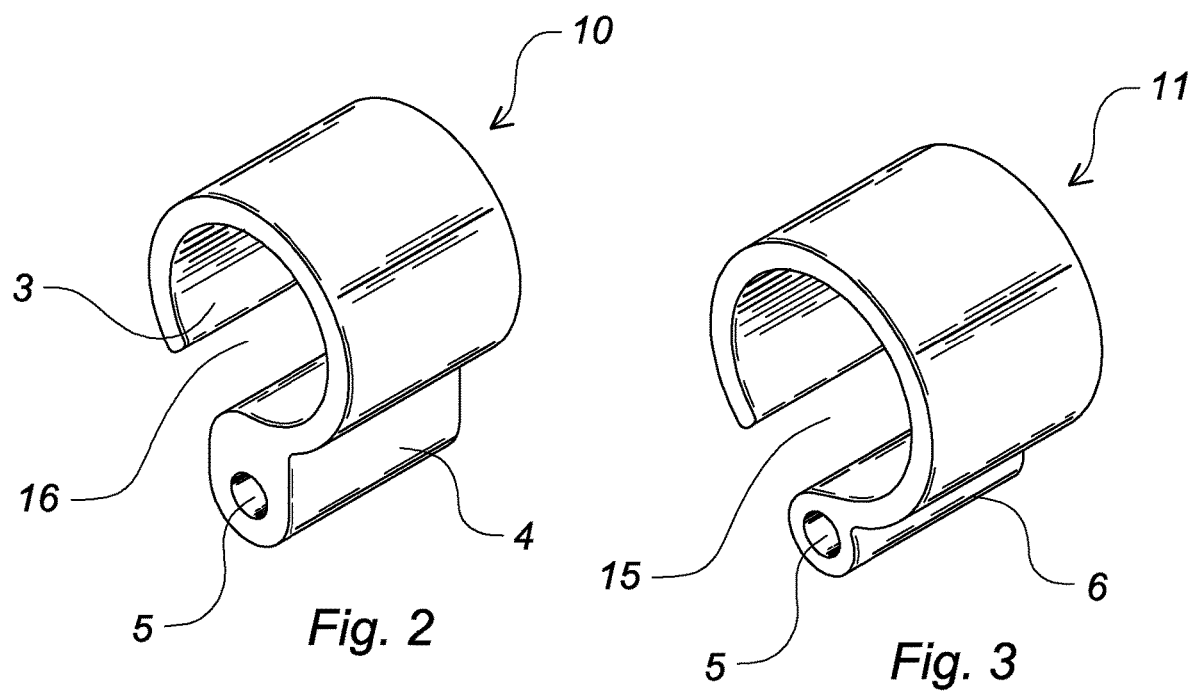
Fig. 2
Fig. 3

UNIVERSAL SUPPORT HOOK

CROSS REFERENCE TO RELATED APPLICATIONS

This application is entitled to the benefit of provisional patent application No. 62/324,755 filed on Apr. 19, 2016, the specification of which is incorporated herein by reference.

BACKGROUND OF THE INVENTION

The present invention relates to a device that is easily attachable to a variety of support structures to suspend bags, purses, jewelry or virtually any other item therefrom.

DESCRIPTION OF THE PRIOR ART

It is often convenient to suspend personal items nearby but a suitable support hook or hanger is rarely available. For example, shoppers typically transport purses, shopping bags or other items while maneuvering a shopping cart. The items are often stored in the child seat, which annoys a child and occupies storage space. Although the item may be placed within the cart's storage compartment, it will eventually be buried beneath collected goods or merchandise.

A traveler may wish to conveniently access personal items when seated in an airline or train passenger seat. However, conventional passenger seats only include luggage compartments above the seat and minimal space beneath the seat, either of which is not easily accessible.

A closet rod is an ideal structure for suspending articles but requires a clothes hanger that is unsuitable for certain items. Furthermore, the storage capacity of a conventional clothes hanger is limited.

Accordingly, there is currently a need for a device that allows a user to more easily suspend a desired article from various support structures. The prior art includes at least one hook that purports to address some of the aforementioned problems. For example, U.S. Pat. No. 2,565,719 issued to Church discloses a handbag support that is specifically designed to clamp to the edge of a table or shelf. The device includes an upper hook with a pair of spaced plates at a lower end. A second lower hook includes a flange that is pivotally secured between the plates. The flange includes an extension that assures that the rear surface of the lower hook engages the lower surface of a shelf or table to prevent further rotation and to clamp the device thereto. Because the extension is specifically designed to limit rotation, the device's versatility is limited.

Furthermore, in order for the device of Church to operate as described above, the two hooks must lie in substantially the same vertical plane. Therefore, to allow the device to nest in a collapsed orientation, the upper hook must be slotted to receive the lower hook. However, the upper hook must be equipped with a flat head at an upper end to firmly grip the support surface. The head obstructs the slot and prevents the device from being collapsed if the lower hook is rotated toward the front surface of the upper hook. Therefore, to collapse the device, a user can only rotate the lower hook into the slot from one direction, i.e. toward the rear surface of the upper hook. If the lower hook is rotated toward the front surface of the upper hook, the head prevents it from collapsing or nesting within the upper hook.

The present invention overcomes the disadvantages of the prior art by providing a plurality of identically configured, juxtaposed C-shaped hangers having axially aligned lower ends that are rotatably mounted on a pin. Any number of hangers can be raised and secured to a support structure while a remaining number can be lowered to suspend a desired article from the support structure. Each hanger is freely rotatable in either direction within a 360-degree range to allow various articles to be suspended from a myriad of support surfaces regardless of angle. A central hanger is reinforced to withstand heavier items that are suspended from the side hangers. Furthermore, the C-shaped gripping members are flexible but resilient and have a nearly continuous circumference to expand around larger-diameter support structures while preventing inadvertent displacement of suspended items.

SUMMARY OF THE INVENTION

The present invention relates to a universal support hook comprising an elongated pin having a plurality of juxtaposed hangers rotatably mounted thereon. Each hanger includes a C-shaped gripping member with a hinge barrel at an upper end thereof. The hinge barrel includes a central, transverse bore that receives the pin to allow the hanger to freely rotate within a 360-degree range. When any desired number of hangers are raised to a vertical position, their C-shaped gripping members can be secured to a tubular or thin support structure, such as a passenger-seat tray, a closet rod, a chair frame or a shopping-cart handle. The remaining hangers freely hang from the pin to provide a hook for suspending handbags, jewelry items, garments and other similar items from the support structure.

It is therefore an object of the present invention to provide a device that conveniently suspends personal items from a variety of support structures.

It is another object of the present invention to provide a universal support hook that can be compactly transported and stored in a pocket, purse or other convenient location.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a perspective view of the universal support hook according to the present invention.

FIG. 2 is an isolated perspective view of the central gripping member.

FIG. 3 is an isolated perspective view of an exemplary side gripping member.

DESCRIPTION OF THE PREFERRED EMBODIMENT

Figure 4:
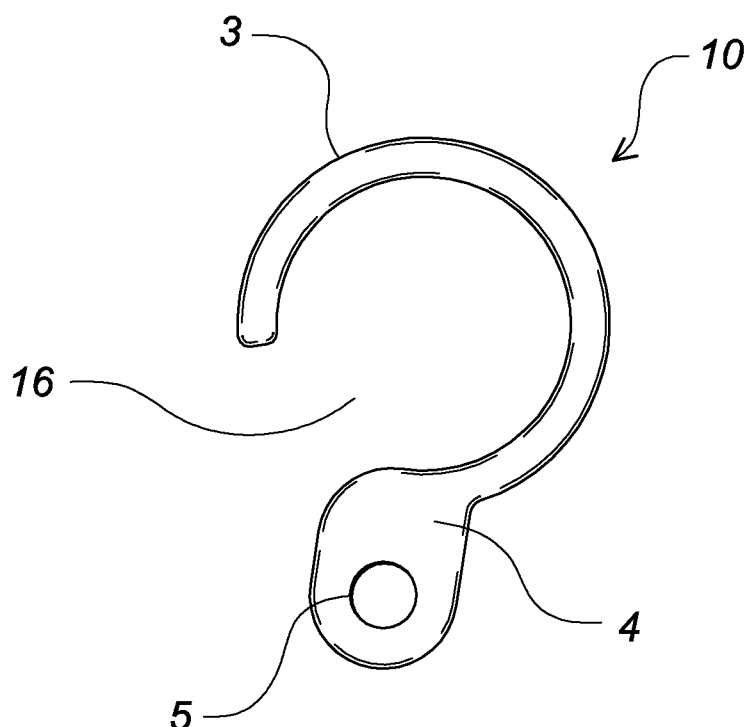
FIG. 4 is a plan view of the central gripping member.
Figure 5:
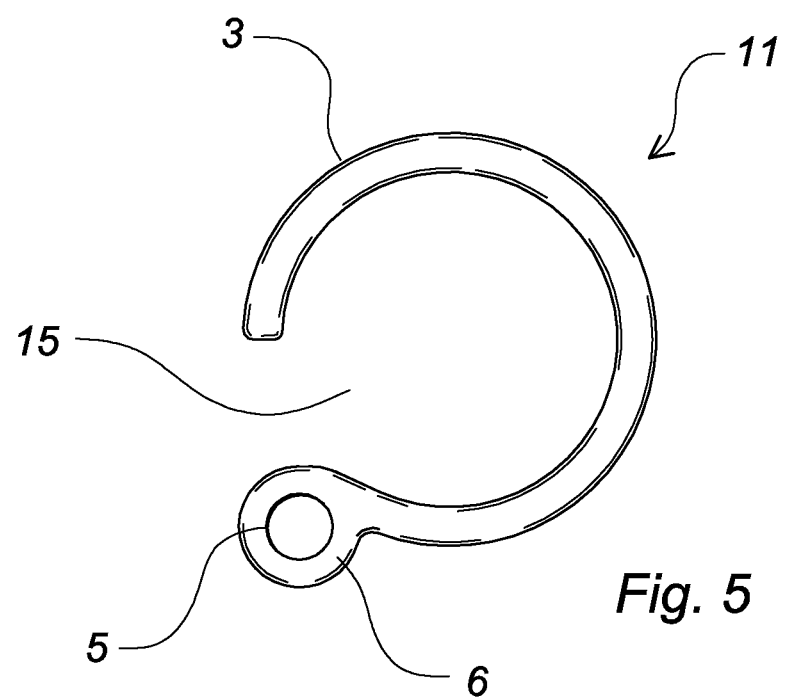
FIG. 5 is a plan view of the side gripping member.

The present invention relates to a universal support hook comprising an elongated pin 1 having a plurality of juxtaposed hangers 2 rotatably mounted thereon. In the preferred embodiment, the device includes a central hanger 10 flanked by a pair of side hangers 11. Each hanger 10, 11 includes a C-shaped gripping member 3 that terminates at an upper hinge barrel 4, 6. The hinge barrel includes a central, transverse bore 5 axially aligned with every other bore all of which receive the pin to allow each hanger to freely rotate within a 360-degree range.

The central hanger hinge barrel 4 has a thicker, flatter, ovate cross section whereas the hinge barrels 6 on the side hangers are tubular. Accordingly, when suspending heavier items, such as a loaded purse, a user secures the central hanger to a support structure to allow the thicker hinge barrel to more effectively withstand the load being applied to the side hangers.

The gripping members have a nearly continuous circumference with a small gap or notch formed therein to allow it to encircle substantially the entirety of a tubular support structure, even if the outer diameter of the support structure is greater than the inner diameter of the gripping member. In the preferred embodiment, the circumference of the central hanger gripping member is less than that of the side hangers and includes a wider gap 16. The side hangers nearly form a complete circle with a minimal gap 15 or notch formed in the circumference.

Therefore, the gripping members firmly cling to a support structure without additional clamps, tabs, ledges or other retaining structures. Furthermore, the minimal gap in the side hangers prevent inadvertent displacement of straps, handles, hangers, hooks, etc. that are suspended therefrom. However, the flexible but resilient gripping members expand to tightly encircle support structures having a larger diameter when a side hanger is used to anchor the device to the support structure.

When any desired number of hangers are raised to a vertical position, their C-shaped gripping members can be secured to a tubular or thin support structure, such as a passenger-seat tray, a closet rod, a chair frame or a shopping-cart handle. The remaining hangers freely hang from the pin to provide a hook for suspending handbags, jewelry items, garments and other similar items from the support structure. Furthermore, because the hangers can rotate within a 360-degree range, the device is more versatile and allows the hangers to be moved into a variety of positions relative any others that are secured to the support surface. When not in use, the compact device can be collapsed into a tubular orientation and easily transported and stored in a pocket, a purse or an accessory case until needed.

The above-described device is not limited to the exact details of construction and enumeration of parts provided herein. The hangers described above are preferably constructed with an injection-molded plastic polymer that has been infused with nylon to significantly increase the load capacity of the device while allowing it to flex slightly. However, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A universal support hook comprising: a plurality of juxtaposed hangers rotatably mounted on a pin, each of said hangers including a substantially C-shaped gripping member that terminates at an upper end; a hinge barrel at the upper end of said gripping member, said hinge barrel having a central, transverse bore that receives said pin, each of said hangers freely rotatable 360 degrees in either direction on said pin whereby any number of hangers can be raised and secured to a support structure and any remaining number can be lowered to suspend a personal item from said support structure wherein the hinge barrel on said central hanger has a thick, flat, ovate cross section whereby when the central hanger is secured to a support structure, the universal support hook withstands a heavy load applied to the side hangers.

2. A universal support hook comprising: a plurality of juxtaposed hangers each having a substantially C-shaped gripping member and axially aligned upper ends, each of said upper ends having a bore, the bore on each of said hangers aligned with the bore on every other hanger; a pin received within the bore of each of said hangers, each of said hangers freely rotatable 360 degrees in either direction on said pin whereby any number of hangers can be raised and secured to a support structure and any remaining number can be lowered to suspend a personal item from said support structure, and whereby all of said hangers are collapsible into a tubular orientation and easily transported and stored in a pocket, a purse or an accessory case until needed wherein the hinge barrel on said central hanger has a thick, flat, ovate cross section whereby when the central hanger is secured to a support structure, the universal support hook withstands a heavy load applied to the side hangers.

3. A universal support hook comprising: a central hanger flanked by a pair of side hangers, said central hanger and said side hangers each including a C-shaped gripping member that terminates at an upper hinge barrel having a bore, the bore on the hinge barrel on said central hanger axially aligned with the bore on the hinge barrel on said side hangers; a pin received within the bore on the hinge barrel on said central hanger and the bore on the hinge barrel on each of said side hangers, said central hanger and said side hangers freely and independently rotatable 360 degrees in either direction on said pin wherein the hinge barrel on said central hanger has a thick, flat, ovate cross section whereby when the central hanger is secured to a support structure, the universal support hook withstands a heavy load applied to the side hangers.

4. The universal support hook according to claim 3 wherein said gripping members have a substantially continuous circumference with a notch formed therein to allow said gripping members to encircle substantially an entirety of a tubular support structure having an outer diameter that is greater than an inner diameter of the gripping member and to prevent inadvertent displacement of items suspended therefrom.

5. The universal support hook according to claim 4 wherein the circumference of the central hanger gripping member is less than the circumference the side hangers.

6. The universal support hook according to claim 5 wherein said gripping members are flexible but resilient to be expandable about support structures having a larger diameter than said gripping members.

\* \* \* \* \*